No. 616,969. Patented Jan. 3, 1899.
L. PYLE.
NUT LOCK WASHER.
(Application filed Aug. 22, 1898.)
(No Model.)

Attest
Lillie M. Simpkinson
Arthur Selfendahl

Inventor
Liza Pyle
by
E. C. Pyle
attorney

UNITED STATES PATENT OFFICE.

LIZA PYLE, OF ROSS, KENTUCKY.

NUT-LOCK WASHER.

SPECIFICATION forming part of Letters Patent No. 616,969, dated January 3, 1899.

Application filed August 22, 1898. Serial No. 689,256. (No model.)

*To all whom it may concern:*

Be it known that I, LIZA PYLE, a citizen of the United States, residing at Ross, in the county of Campbell, State of Kentucky, have invented a new and useful Nut-Lock Washer, of which the following is a specification.

My invention relates to improvements in nut-lock washers in which the washer consists of a combination of rubber and metal of such a form and shape that when the same is fixed in place the washer becomes stationary and the nut when brought to its base has so embedded its corners into the rubber portion of the washer as to make it (the nut) permanently fixed in position.

The objects of my improvement are, first, to provide a nut-lock washer that will make a permanent lock for all nuts whenever used; second, to provide such a nut-lock washer as will not interfere with the removal of the nut and at the same time operate as a perfect lock, and, third, to provide such a nut-lock washer as may be used principally upon rail-joints of railways, but which may be used at any other place desirable. I attain these objects by the mechanism illustrated in the accompanying drawings, in which—

Figure 1:
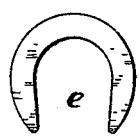
Figure 2:
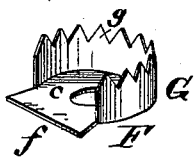
Figure 3:
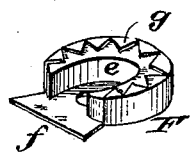
Figure 4:
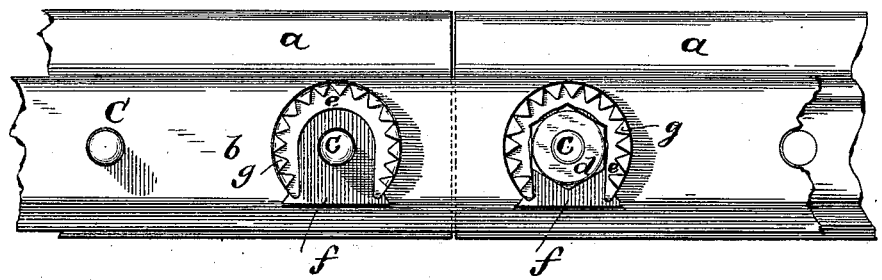
Figure 5:
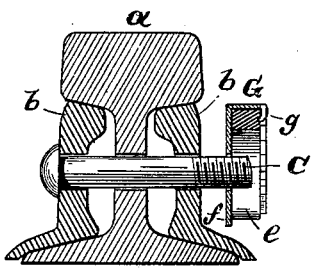
Figure 6:
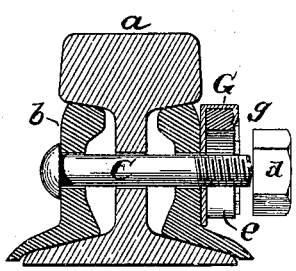
Figure 7:
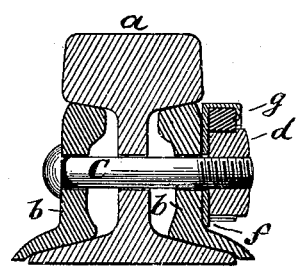

Figure 1 presents the top view of the rubber part of the washer for use upon rail-joints in railroads; Fig. 2, the metal part or cup prepared to receive the rubber part for use on rail-joints in railroads; Fig. 3, the complete washer for use on rail-joints; Fig. 4, a section of a rail-joint, showing three different stages in the application of the washer; Fig. 5, a sectional view of the rail-joint with the washer being slipped into place; Fig. 6, a sectional view of the rail-joint with the washer in its proper position preparatory to the putting on of the nut; Fig. 7, a sectional view of the rail-joint with the nut and washer both in place.

Similar letters refer to similar parts throughout the several views.

The rubber $e$ and metallic cup F constitute the several parts of the washer for use upon rail-joints, the rubber $e$ being made of such a size and shape as to fit snugly within the cup F and of such a width and depth as to give it resistance, the depth to be governed by the depth of the nut to be used, the rubber $e$ having an inner circumference, the shortest diameter of which being equal to the shortest outer diameter of the nut $d$, so that the points of nut $d$ when being screwed home will embed themselves into the rubber $e$, as shown in Figs. 4 and 7. The cup F is made of some metallic substance, giving it strength and durability, having through it the hole $c$ to receive the bolt C. Extending downward from the hole $c$ is the projection $f$ of the metallic portion of the washer, which is of such a length from the center of the hole $c$ to the base of the projection as to permit the washer to pass over the bolt C, thus making the base of the projection $f$ rest upon the flange or lip of the fish-plate $b$, as shown in Fig. 4, making the washer fixed in position with respect to revolving about the bolt C. Around the top of the cup F are the points $g$, which are of less length than the width of the rubber $e$, so that when they are bent down and sunken into the rubber $e$, as indicated in Figs. 7 and 3, the rubber $e$ will be stationary within the cup F and at the same time the points $g$ will not interfere with the corners of the nut $d$ embedding themselves into the rubber $e$. The sides G of the cup F when the washer is completed for use are of as much less thickness than the nut $d$ as will not interfere with the free use of the wrench upon the nut $d$, as shown in Fig. 7. The washer when thus constructed and put in place over the bolt C becomes stationary with respect to the motion of the nut $d$, whereas the corners of the nut $d$ when it is screwed home have embedded themselves into the rubber $e$, thus making for the nut $d$ a rubber jacket of the shape of the nut, as shown in Fig. 4.

Having thus described my invention, that which I desire to secure by Letters Patent is—

The combination of the rubber $e$ with the metallic cup F held firmly together by the points $g$ being sunken into the rubber $e$ so constructed that the shortest diameter of the inner circumference of the rubber $e$ will be equal to the shortest diameter of the outer circumference of the nut $d$ requiring the corners of the nut $d$ to embed themselves as the nut is being screwed home into the rubber $e$, thus making the tight-fitting jacket of the rubber $e$ about the nut $d$, at the same time not interfering with the removal or tightening of the nut $d$.

LIZA PYLE.

Witnesses:
LILLIE M. SIMPKINSON,
ARTHUR DELFENDAHL